United States Patent
Kuvik

[15] 3,662,803
[45] May 16, 1972

[54] MAIL BAG PROTECTOR

[72] Inventor: Joseph J. Kuvik, 4601 West 97th Place, Oak Lawn, Ill. 60453

[22] Filed: Sept. 25, 1970

[21] Appl. No.: 75,351

[52] U.S. Cl................................150/52 R, 135/5 R, 150/52 E, 248/98, 280/47.35
[51] Int. Cl.......................................................B65d 65/02
[58] Field of Search .....................150/52 R, 1.5 R, 1.5 B, 13, 150/15, 19, 21, 22; 280/47.35; 224/43; 135/5 R, 14 V; 248/98

[56] References Cited

UNITED STATES PATENTS

| | | |
|---|---|---|
| 3,024,824 | 4/1962 | Bass.........................................150/52 |
| 1,552,563 | 9/1925 | Labisky..............................150/52 X |
| 2,907,364 | 10/1959 | Trenery...........................150/1.5 A X |
| 2,702,062 | 2/1955 | Jenswold ..................................150/52 |

Primary Examiner—Joseph R. Leclair
Assistant Examiner—Stephen P. Garbe
Attorney—Berman, Davidson and Berman

[57] ABSTRACT

A mail bag protector for protecting mail bags suspended on a cart of the type having the mail bags secured to the cart by means of cleats on the cart over which rings secured to the bag are engaged. The protector consist of a flexible transparent plastic panel having rings secured centrally thereof for engagement over the cleats on the cart with the panel overlying the open top of the bags. In a modified form of the invention the rings are magnetized to improve their grip with the cleats.

1 Claim, 4 Drawing Figures

PATENTED MAY 16 1972

3,662,803

INVENTOR
JOSEPH J. KUVIK

BY
Berman, Davidson & Berman
ATTORNEYS

MAIL BAG PROTECTOR

BACKGROUND OF THE INVENTION

1. Field of the Invention

The present invention relates to the protection of open top mail bags secured to a cart by means of rings on the bag engaging over cleats on the cart.

2. Summary of the Invention

In the present invention a conventional mail bag cart having mail bag cleats formed thereon for engagement by the rings of the mail bag has a transparent plastic panel engaged thereover. The transparent plastic panel has a plurality of attaching rings secured thereto with the attaching rings being adapted to engage over the cleats on the cart to support the transparent plastic panel in overlying relation with respect to the mail bags. In a form of the invention the rings on the panel are magnetized to improve their grip with the cleats of the cart.

The primary object of the invention is to provide a protective panel overlying mail bags on a cart so as to prevent rain, snow and the like from damaging the mail.

Other objects and advantages will become apparent in the following specification when considered in the light of the attached drawings.

DESCRIPTION OF THE PREFERRED EMBODIMENT

Figure 2:
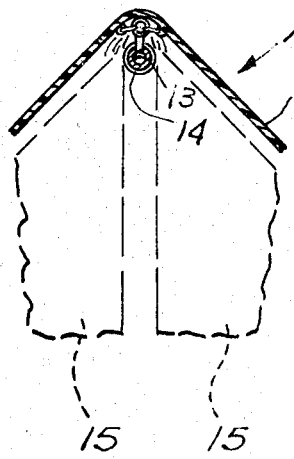
FIG. 2 is an enlarged vertical cross section taken along the line 2—2 of FIG. 1 looking in the direction of the arrows with parts broken away for convenience of illustration.
Figure 1:
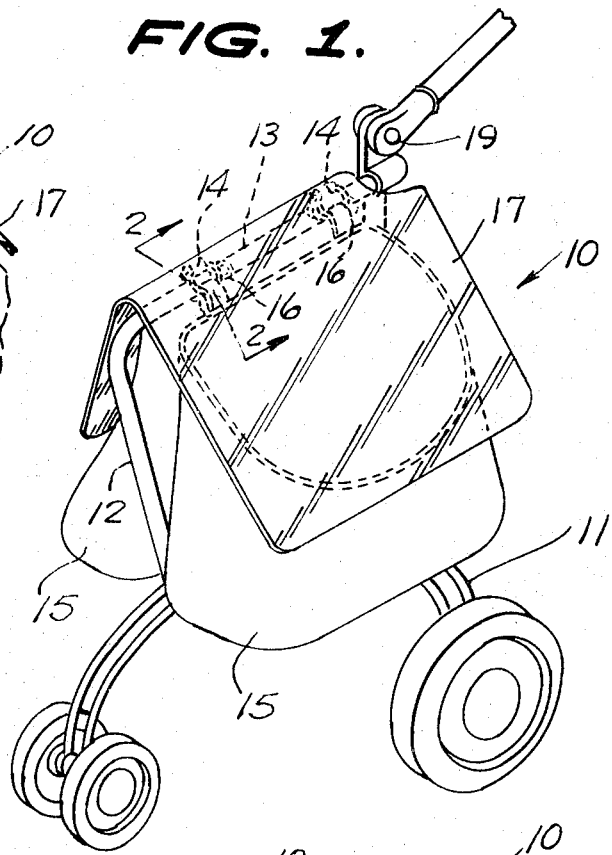
FIG. 1 is a perspective view of the invention.
Figure 3:
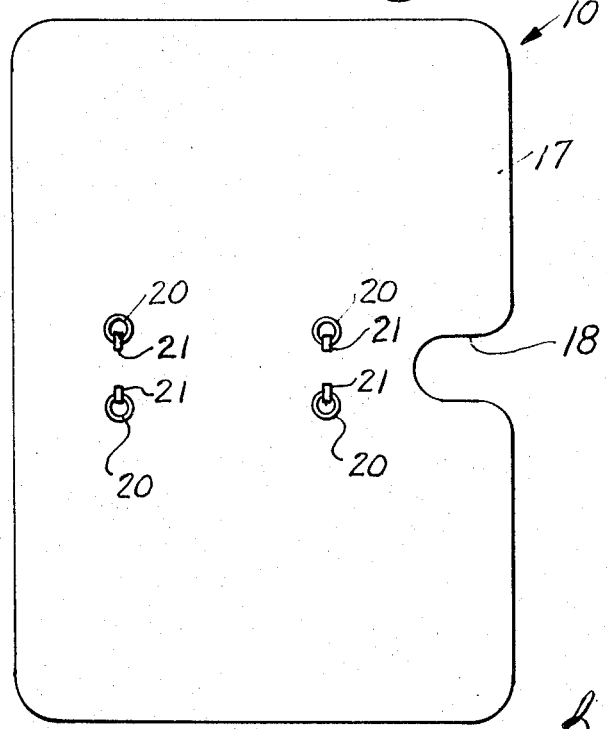
FIG. 3 is a bottom plan view of the panel.
Figure 4:
FIG. 4 is an edge view of the panel.
Figure 5:
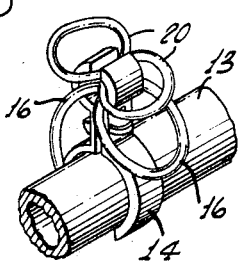

Referring now to the drawings in detail wherein like reference characters indicate like parts throughout the several figures the reference numeral 10 indicates generally a mail bag protector constructed in accordance with the invention.

The mail bag protector 10 is adapted for use with a mail bag cart 11 of conventional design and having an upright support 12 carrying a horizontal bar 13 thereon. The bar 13 has a pair of spaced apart cleats 14 rigidly secured thereto for reasons to be assigned. A pair of conventional mail bags 15 are mounted on opposite sides of the bar 13 and are provided with a pair of rings 16 which are adapted to engage in the cleat 14 to secure the bags 15 to the cart 11.

A flat flexible transparent plastic panel 17 has a notch 18 formed in one side edge thereof to permit the handle 19 of the cart 11 to extend upwardly therethrough. The panel 17 has a plurality of rings 20 secured thereto by means of a boss 21 throughwhich they extend. The rings 20 are spaced apart equal to the distance that the cleats 14 are spaced apart and the rings 20 are adapted to engage in the cleat 14 to secure the panel 17 to the cart 11.

The rings 20 may be magnetized if desired to improve their holding power with respect to the cleats 14.

In the use and operation of the invention the flexible transparent panel 17 is draped across the rod 13 completely covering the open top of the mail bags 15. The mailman when ready to remove mail from the mail bag 15 can visually inspect the contents of the bag without removing the panel 17 and can grasp the package of mail from the bag 15 by only slightly raising the panel 17 to give hand excess to the contents of the bag 15.

Having thus described the preferred embodiment of the invention it should be understood that numerous structural modifications and adaptations may be resorted to without departing from the spirit of the invention.

What is claimed is:

1. The mail bag protector for use with mail bags mounted on a supporting cart of the type having a horizontal bar and a pair of spaced apart cleats secured thereto for receiving spaced mounting rings secured to the mail bags comprising a flexible transparent plastic panel, a plurality of spaced apart bosses integrally secured to the underside of said panel and projecting downwardly therefrom, and a ring pivotally mounted in each of said bosses for engaging in said cleats to secure said panel to said bar in overlying relation to mail bags supported on opposite sides of said bar, said panel having a notch extending deeply into one lateral side edge thereof intermediate the end edges of said panel for extending around the handle of said cart.

* * * * *